United States Patent
Aggarwal et al.

(10) Patent No.: US 8,392,398 B2
(45) Date of Patent: Mar. 5, 2013

(54) QUERY OPTIMIZATION OVER GRAPH DATA STREAMS

(75) Inventors: Charu C. Aggarwal, Yorktown Heights, NY (US); Min Wang, Tarrytown, NY (US); Peixiang Zhao, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/511,627

(22) Filed: Jul. 29, 2009

(65) Prior Publication Data

US 2011/0029571 A1    Feb. 3, 2011

(51) Int. Cl.
*G06F 7/00* (2006.01)
*G06F 17/30* (2006.01)

(52) U.S. Cl. ......... 707/713; 707/750; 707/769; 707/798

(58) Field of Classification Search .................. 707/713, 707/748, 750, 769, 776, 778, 793, 795, 796, 707/797, 798, 802, 803, 968
See application file for complete search history.

(56) References Cited

U.S. PATENT DOCUMENTS

| | | | | |
|---|---|---|---|---|
| 5,875,334 | A * | 2/1999 | Chow et al. | 717/141 |
| 6,230,151 | B1 * | 5/2001 | Agrawal et al. | 706/12 |
| 6,963,959 | B2 * | 11/2005 | Hsu et al. | 711/165 |
| 7,269,597 | B2 * | 9/2007 | Stockfisch | 1/1 |
| 7,328,220 | B2 * | 2/2008 | Dobra et al. | 707/714 |
| 7,340,460 | B1 * | 3/2008 | Kapur et al. | 1/1 |
| 2004/0088504 | A1 * | 5/2004 | Hsu et al. | 711/158 |
| 2006/0067296 | A1 * | 3/2006 | Bershad et al. | 370/351 |
| 2008/0071748 | A1 * | 3/2008 | Wroblewski et al. | 707/3 |

OTHER PUBLICATIONS

C.C. Aggarwal et al., "XProj: A Framework for Projected Structural Clustering of XML Documents," ACM SIGKDD Conference, Aug. 2007, pp. 46-55.
N. Alon et al., "The Space Complexity of Approximating the Frequency Moments," ACM Symposium on Theory of Computing, May 1996, pp. 20-29.
G. Cormode et al., "An Improved Data Stream Summary: The Count-Min Sketch and its Applications," Journal of Algorithms, Apr. 2005, pp. 58-75, vol. 55, No. 1.
P. Domingos et al., "Mining High-Speed Data Streams," In Proceedings of the Association for Computing Machinery Sixth International Conference on Knowledge Discovery and Data Mining, Aug. 2000, pp. 71-80.
M. Faloutsos et al., "On Power-Law Relationships of the Internet Topology," ACM SIGCOMM Conference, Aug. 1999, pp. 251-262.
S. Guha et al., "Clustering Data Streams," IEEE FOCS Conference, Nov. 2000, pp. 359-366.
L. O'Callaghan et al., "Streaming-Data Algorithms for High-Quality Clustering," ICDE Conference, Feb. 2002, pp. 685-694.

(Continued)

*Primary Examiner* — Merilyn Nguyen
(74) *Attorney, Agent, or Firm* — William Stock; Ryan, Mason & Lewis, LLP

(57) ABSTRACT

A method for executing a query on a graph data stream. The graph stream comprises data representing edges that connect vertices of a graph. The method comprises constructing a plurality of synopsis data structures based on at least a subset of the graph data stream. Each vertex connected to an edge represented within the subset of the graph data stream is assigned to a synopsis data structure such that each synopsis data structure represents a corresponding section of the graph. The method further comprises mapping each received edge represented within the graph data stream onto the synopsis data structure which corresponds to the section of the graph which includes that edge, and using the plurality of synopsis data structures to execute the query on the graph data stream.

24 Claims, 3 Drawing Sheets

OTHER PUBLICATIONS

T. Zhang et al., "BIRCH: An Efficient Data Clustering Method for Very Large Databases," ACM SIGMOD Conference, Jun. 1996, pp. 103-114, vol. 25, No. 2.

Jeffrey S. Vitter, "Random Sampling with a Reservoir," ACM Transactions on Mathematical Software, Mar. 1985, pp. 37-57, vol. 11, No. 1.

D. Chakrabarti et al., "R-MAT: A Recursive Model for Graph Mining," SDM Conference, Apr. 2004, pp. 442-445.

X. Yan et al., "CloseGraph: Mining Closed Frequent Graph Patterns," ACM SIGKDD Conference, Aug. 2003, pp. 286-295.

X. Yan et al., "Mining Significant Graph Patterns by Leap Search," SIGMOD Conference, Jun. 2008, pp. 433-444.

M.J. Zaki et al., "XRules: An Effective Structural Classifier for XML Data," ACM SIGKDD Conference, Aug. 2003, pp. 316-325.

\* cited by examiner

QUERY OPTIMIZATION OVER GRAPH DATA STREAMS

FIELD OF THE INVENTION

The present invention relates generally to processing of graph data streams and, more particularly, to techniques for optimizing queries over massive graph data streams.

BACKGROUND OF THE INVENTION

In recent years, numerous network applications have resulted in streams being defined over massive graph infrastructures. In such applications, the entire graph is not available at one time, but individual edges are received rapidly over time in the form of a stream. Furthermore, the number of vertices in the graph is very large, so that it becomes very difficult to store the edges in the graph in an efficient way.

It is often desirable to query and mine such massive graph streams, and the key is to summarize the behavior of graph streams accurately and effectively. However, mining graph streams in which the data is too large to be stored even on disk poses particular challenges since the entire data cannot be explicitly stored for querying purposes.

SUMMARY OF THE INVENTION

An illustrative embodiment of the invention includes a method for executing a query on a graph data stream. The graph data stream comprises data representing edges that connect vertices of a graph. The method comprises constructing a plurality of synopsis data structures based on at least a subset of the graph data stream. Each vertex connected to an edge represented within the subset of the graph data stream is assigned to a synopsis data structure such that each synopsis data structure represents a corresponding section of the graph. The method further comprises mapping each received edge represented within the graph data stream onto the synopsis data structure which corresponds to the section of the graph which includes that edge, and using the plurality of synopsis data structures to execute the query on the graph data stream.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
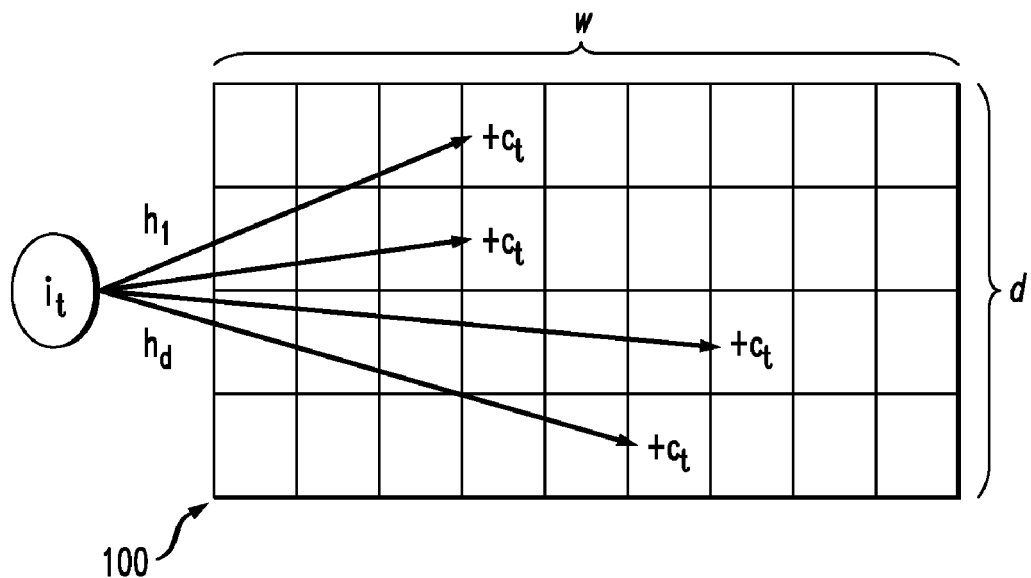
FIG. 1 shows an exemplary sketch table suitable for use with an embodiment of the invention.

Many recent applications such as social networking and communication graphs can be modeled as massive inter-connected graph structures. The massive nature of such applications often makes many data mining and management applications extremely challenging. In dynamic applications such as social networking, the edges are received sequentially rather than at one time. For example, in a social network, which is modeled as a graph network on user-vertices, the edges may correspond to messages exchanged between different users over time.

Graph mining has seen an interest in recent years because of many kinds of data such as semi-structured or XML data, which are inherently structured in the form of graphs. As a result, many mining applications such as frequent pattern mining, classification and indexing have been extensively studied in the graph domain. In most of these applications, the graphs are available in pre-stored format, which are then utilized for mining purposes. Some examples of such graph streams are as follows:

In many internet applications such as intrusion detection, the vertices in the graph correspond to the IP addresses, and the edges correspond to the source and destination of possible intrusion attacks.

In social-networking applications, the vertices may correspond to the participants in the social-network, and the edges correspond to interactions among these participants. For very large social networks, such streams can have a rapid rate.

Telecommunication companies may want to analyze the pattern of their phone calls for marketing purposes. In this case, the vertices correspond to the phone-numbers and edges correspond to the calls between different numbers. For a very large company, the arrival rate of the edges may be of the order of several thousand a second.

Such applications are very large scale, and therefore, the speed of the edges received may be very large over time. It may not be possible to explicitly store the graph structure on disk. Therefore, the standard stream constraint of being able to process an edge only once applies in this case. Furthermore, for large applications, the number of vertices may be of the order of millions. Consequently, the number of possible edges is so large, that maintaining even summary statistics (such as frequency counts) over the edges may be too challenging from a space-efficiency perspective.

Therefore, performing even simple querying and mining operations over such graphs is extremely challenging, since the entire graph is not available, and furthermore, explicit edge-based summaries are challenging to maintain because of the extremely large number of possibilities. Examples of such querying and mining operations include (1) estimating the frequency of particular edges in the stream and (2) determining the aggregate frequency of the edges in a particular query subgraph.

In an illustrative embodiment, there is a vertex set $\mathcal{N}$ over which a graph is defined, and each element in $\mathcal{N}$ is a string which defines the label of the corresponding vertex. For example, in the case of an intrusion application, each of the strings in $\mathcal{N}$ may correspond to IP addresses. The incoming edges have the form $(X_1, Y_1) \ldots (X_i, Y_i) \ldots$, which are directed edges with a source vertex $X_i \in \mathcal{N}$ and destination vertex $Y_i \in \mathcal{N}$, and the edge-pair $(X_i, Y_i)$ is encountered at the time-stamp $T_i$. In the event of an undirected graph, lexicographic ordering on vertex labels may used in order to determine the direction of the edge.

In some applications, a frequency $q(X_i, Y_i, T_i)$ may associated with the edge $(X_i, Y_i)$. For example, in a telecommunication application, the frequency $q(X_i, Y_i, T_i)$ may represent the number of minutes of phone conversation between the edge-pair $(X_i, Y_i)$ for the ith edge received. In other applications, such as intrusion detection, the value of $q(X_i, Y_i, T_i)$ may be implicitly assumed to be 1.

Using this notation, the aforementioned queries could be defined as (1) determine the frequency of the edge (W,Z) and (2) determine the aggregate frequency of the edges in the subgraph $G_s$ containing the edges denoted by $(W_1, Z_1) \ldots (W_m, Z_m)$. The second query is essentially a generalization of the first query in the sense that it performs the query over a bag of edges rather than a single edge, and thus can be resolved by summing the answers over individual queries in the bag. Therefore, the disclosure herein will focus on the optimization of the queries over individual edges, since the subgraph case can be formulated as a function of this query.

It can be shown that each of the queries discussed before can be extended to several techniques in a sketch-based approach. More generally, a graph stream application can be considered an application of any sketch method for stream summarization, provided that the edges in the stream are represented appropriately.

A preferred solution to the aforementioned challenges would be to use a synopsis structure which can be stored and maintained efficiently, and which could be used efficiently for mining and querying purposes. An example of a synopsis structure of a graph is a sketch data structure. Sketch data structures were designed for enumeration of different kinds of frequency statistics of data sets, when the underlying domain size is very large.

One example of a sketch-based approach is the hash-based count-min sketch described in G. Cormode & S. Muthukrishnan, "An Improved Data-Stream Summary: The Count-min Sketch and its Applications," *Journal of Algorithms*, 55(1), 2005, the disclosure of which is incorporated by reference herein. Although illustrative embodiments of the present invention described herein utilize this particular sketch data structure, principles of the invention are suitable for use with other sketch data structures, and with synopsis data structures more generally.

FIG. 1 shows an illustrative embodiment of a hash-based count-min sketch. The data structure itself (100) consists of a two-dimensional array with a length of w and width of d, thus having w·d cells. The hash-based sketch uses d pairwise independent hash functions $(h_1 \ldots h_d)$, each of which maps onto uniformly random integers in the range [0,w]. Thus, each hash function could be thought of as corresponding to one of d 1-dimensional arrays with w cells each.

In an exemplary count-min sketch, the hash functions are used in order to update the counts of the different cells in this 2-dimensional data structure. For example, consider a 1-dimensional data stream with elements drawn from a massive set of domain values. When a new element (e.g., $i_t$) of the data stream is received, we apply each of the d hash functions to map onto a number in [0 . . . w−1]. The count of each of the set of d cells is incremented by 1.

In order to estimate the count of an item, this approach determines the set of d cells to which each of the d hash-functions map, and then determines the minimum value among all these cells. The sketch can be used in order to estimate the frequency behavior of individual edges by treating each edge as an item with a unique string value. We note that each edge $(X_i, Y_i)$ can be treated as the string $X_i \oplus Y_i$ where $\oplus$ is the concatenation operator on the vertex label strings $X_i$ and $Y_i$. This string can then be hashed into the table in order to maintain the counts of different edges.

Let $c_t$ be the true value of the count being estimated, which may be denoted as $\hat{c}_t$. The estimated count $\hat{c}_t$ is at least equal to $c_t$, since counts must be non-negative. There may be an over-estimation because of collisions among hash cells. A probabilistic upper bound to the estimate may be determined. It has been shown, for example in the aforementioned Cormode & Muthukrishnan reference, that for a data stream with N arrivals, the estimate $\hat{c}_t$ is at most $c_t + e \cdot N/w$ with probability at least $1 - e^{-d}$, where e is the base of natural logarithms. In other words, the error in answering a query within a factor of $\epsilon$ with probability $\delta$, where $w = \lceil e/\epsilon \rceil$ and $d = \lceil \ln(1/\delta) \rceil$. Note that even modest values of d result in high probabilities of success.

Although the count-min discussed above presents a seemingly straightforward solution for the graph stream problem, it has vulnerabilities of this solution in terms of accuracy. More particularly, in many real applications, the frequency behavior over different regions of the graph is extremely skewed. Accordingly, mining and querying operations over less frequent regions can become extremely inaccurate with the use of a global sketch such as that discussed above.

This is because when N edges have been received by the stream, the relative error of estimation for an edge with the true frequency $c_t$, could be as large as $(e/w)(N/c_t)$, which can be quite large for low values of $c_t$. Often, many low-frequency portions of the graph may be very relevant for querying, and may show up repeatedly in the workload. If this is the case, then the relative error from using such an approach can be extremely high.

However, massive graph structures such as those found in internet applications are typically not random. The common characteristics which are often found in massive graphs include:

Global Heterogeneity and Skews: The relative frequencies of the different edges in the network structure are very uneven. This is true across different kinds of measures such as the vertex degrees or the edge frequencies. For example, the global power-law distribution characterizes this behavior in terms of the degrees of the vertices, as described in M. Faloutsos et al., On Power Law Relationships of the Internet Topology, SIGCOMM Conference, 1999, the disclosure of which is incorporated by reference herein; this behavior is also true of other parameters such as the relative frequencies of the edges.

Local Similarity: Within structurally localized regions of the graph, relative frequencies of the edges are often correlated with one another. This does not mean that the behavior is the same within a local region, but that the correlations of the edge-frequencies within a local region are considerable.

Illustrative embodiments of the present invention advantageously leverage these local and global skew properties in the synopsis construction process. More particularly, one of the factors which leads to high relative error in query processing applications is the considerable variation in the frequency behavior over different regions of the graph. Thus, illustrative embodiments of the present invention partition a global synopsis (such a sketch) to a group of synopses (or sketches). Each sketch is defined for summarizing the edge frequencies associated with particular source vertices. Since it can be assumed that the number of vertices is significantly fewer than the number of possible edges, it is easier to store the partitioning information about the different vertices in main memory.

Preferably, illustrative embodiments exploit the locality proximity property of graph streams, so that edges in different structural localities of the graph are mapped to different sketches. Thus, an illustrative embodiment seeks to include edges with sufficient frequency uniformity within a sketch so that relative count accuracy is maintained over the entire graph. As a result, the relative error in each sketch is much lower compared to conventional techniques in which a single sketch is used globally. Thus, illustrative embodiments obtain much more accurate responses to queries than is possible with the use of a conventional global sketch approach.

In this section, we will introduce the algorithms for sketch partitioning. We note that the process of sketch partitioning is performed as a pre-processing phase (on the data sample) before the actual sketch structure is populated with the data stream. We will discuss the cases in which different kinds of samples may be available. In the first case, we assume that only a sample of the input data stream is available, whereas in the second case, we also assume that a sample of the workload is available.

In order to facilitate further discussion, we will introduce some further notations and definitions. Let use assume that the total number of vertices in the graph is V, and the indices for the vertices are denoted by {1 . . . V}. We note that we assume that we have string identifier $Q_j$ associated with mode j. In most real applications, only the string identifier is used (e.g., URL in a web application), and we assume that a mapping from the string representation to the vertex index is available. We note that this can be implemented by using a hashing scheme from vertex strings to the numerical vertex identifiers. Since our core assumption is that the distinct number of vertices is large but manageable, (and the number of edges is not), it is possible to easily implement a mapping scheme from vertex strings to indices. The edge between vertex indices i and j is denoted by (i, j) and the corresponding frequency is denoted by $q_{ij}$. We note that these edge frequencies need to be estimated by the querying process, and are therefore not explicitly available. In fact these frequencies cannot even be explicitly stored in the case of a large graph. The frequency of a vertex is defined as the sum of the frequencies of the edges emanating from it. We assume that the relative frequency of the vertex i is denoted by $f_i$, and the out-degree of the vertex i is denoted by $k_i$. In the next section, we will discuss some methods for constructing the sketch partitions.

Figure 2:
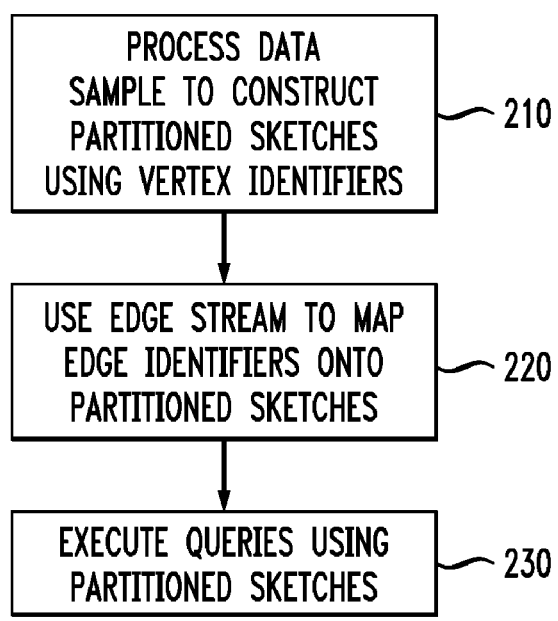
FIG. 2 shows an exemplary process for query optimization according to an embodiment of the invention.

FIG. 2 shows an exemplary process for constructing the sketch partition with the use of an available data sample of the edge stream. In step 210, the data sample is used in order to construct a set of partitioned sketches. As noted above, each of these sketches may be similar to that discussed above with reference to FIG. 1, or other sketches or synopses may be used. Preferably, these partitioned sketches should be constructed to group structural regions of the graph with similar frequency behavior together, as doing so helps in optimizing the relative error in terms of frequency estimation.

In step 220, the incoming data stream is processed and the vertex associations with sketch partitions are used in order to map the edges into different sketch partitions. Thus, the frequency for different edges is stored in different partitions in order to optimize the efficiency of queries.

In step 230, the sketch structure is then used in order to perform the queries over the underlying data stream. Note that subgraph frequency estimation queries can be decomposed into the individual edges which constitute the query. For each such edge we pick the appropriate partition from the sketch structure and estimate the corresponding frequency from the sketch. As previously noted, since subgraph frequency estimation queries can be decomposed into edge queries, the remainder of this disclosure focuses on optimization of edge queries.

In the following description of step 210, we initially make the "oracle" assumption that the edge frequency $v_{ij}$ over the whole stream is known in advance. As heretofore discussed, this "oracle" assumption can be relaxed by using the vertex frequencies as a surrogate for the edge frequencies. Let T be the sum of the frequencies over all edges. Assume that there are a total of k partitions and the space is allocated equally to each partition by dividing the width of the sketch table. The depth of each sketch table is d and the width of the ith sketch table is $w_i=w/k$. Let $S_i$ be the sketch table in the ith partition.

Let $F(S_i)$ be the sum of the frequencies of the edges in $S_i$. The expected frequency values hashed into the cell for edge (m,n) because of erroneous collisions is given by $(F(S_i)-v_{mn})/w_i$. Thus, the expected relative error for any edge $(m,n) \in S_i$ is given by $(F(S_i)-v_{mn} \cdot w_i)-1/w_i$ for any particular row in the hash table. Then, for a sketch table with a depth d=1, the overall relative error $E_i$ over the partition i is given by:

$$E_i = \sum_{(m,n) \in S_i} (F(S_i)/(v_{mn} \cdot w_i) - 1/w_i) \qquad (1)$$

Therefore, the corresponding optimization problem is to partition the edge set into k partitions, which minimizes $$\sum_{i=1}^{k} E_i.$$

Consider a simplification of this problem in which we wish to construct k=2 partitions. This is a difficult problem since it can be recast as a 0-1 integer program with a non-linear objective function. There can be an exponential number of solutions to the problem and it can be hard to determine the optimal solution.

However, one can use a greedy approach in order to construct an effective (if sub-optimal) solution. The idea is to sort the edges by increasing frequency of $v_{mn}$ and consider only those partitions containing edges in contiguously sorted order. The number of such possible partitions is equal to the number of edges (by partitioning at each possible position in the sorted order) and we can pick the partition which optimizes the corresponding objective function.

Note that this solution is still quite difficult to implement, since the edge frequencies are typically not yet known. This is because the number of distinct edges is very large and requires too much storage. Moreover, the number of possible partitions over which we need to optimize is also too large to perform the corresponding computations efficiently. Furthermore, the initial data sample is assumed to have a fairly small size compared to the actual data stream. This means that the data sample cannot be reliably used to estimate the edge frequencies effectively.

However, the data sample can be used in order to estimate frequencies of vertices (aggregate frequencies of edges emanating from vertices) effectively. It is here that the local structural behavior of the graph can be leveraged. We assume local similarity of the edges emanating from the different vertices, and use the frequency behavior of the vertices to perform the partitioning on the vertex set rather than the edge set. Thus, we vertex frequency is used as a proxy for edge frequency to ensure that regions with similar frequency behavior are assigned to a given partition. The partitioning ideally associates the vertex identifiers with the different partitions of the sketch structure such that vertex identifiers in particular graph localities are put together in a single sketch. The idea is to pick graph localities which have similar average frequency of the incident edges.

In most applications, while the number of distinct edges may be very large, the number of distinct vertices is quite manageable from the perspective of storage requirements and computation. Therefore, we can estimate the frequencies of the vertices, which are denoted by $f'_1 \ldots f'_V$. We note that $f'_i$ is simply an estimation of $f_i$ from the sample data stream. Similarly, we estimate the vertex out-degrees as $k'_1 \ldots k'_V$. We note that the average frequency of the vertices emanating from an edge is given by $f'_j/k'_j$. Let us now define the partition $T_1 \ldots T_k$ on the vertex set rather than the edge set. By partitioning the vertex set, we essentially create different sketches on different structural portions of the underlying graph. Then, the frequency $G(T_i)$ of the partition $T_i$ is defined as follows:

$$G(T_i) = \sum_{j \in T_i} f'_j \qquad (2)$$

We assume that $k'_j$ edges emanate from vertex j with an average frequency of $f'_j \ldots k'_j$. Therefore, the analogous approach to Equation 1 with the use of vertex frequency-based statistics defines the error $E_i$ as follows:

$$E_i = \sum_{j \in T_i} \frac{k'_j \cdot G(T_i)}{w_i \cdot f'_j/k'_j} - \sum_{j \in T_i} k'_j/w_i \qquad (3)$$

Note that the $k'_j$ in the numerator accounts for the fact that there are $O(k'_j)$ edges emanating from vertex j. As in the previous case, one possible solution may be to sort the vertices in order of $f'_j/k'_j$ and perform the partition at the point which minimizes the objective function of Equation 3. The number of such partitions is manageable, because the total number of vertices is manageable as well.

In an illustrative embodiment, the partitions are constructed in a recursive top-down fashion as a decision tree. At each level, the tree is partitioned into two children. The space allocated to each branch of the tree is the same. This is done by assuming that the overall width of the sketch table is partitioned equally between both branches. Let $T_1$ and $T_2$ be the two nodes that a given node T is partitioned into. In order to optimize the partitioning into the nodes $T_1$ and $T_2$, we need to optimize the sum of the costs of the corresponding partitions. This sum S is defined as follows:

$$S = \sum_{j \in T_1} \frac{k'_j \cdot G(T_1)}{w_1 \cdot f'_j/k'_j} + \sum_{j \in T_2} \frac{k'_j \cdot G(T_2)}{w_1 \cdot f'_j/k'_j} - \sum_{j \in T_1 \cup T_2} k'_j/w_1 \qquad (4)$$

Since both the partitions have the same sketch-table width ($w_1 = w_2$), we have used $w_1$ throughout the expression rather than using both $w_1$ and $w_2$. In order to further simplify the expression we define the expression Q as follows:

$$M = S \cdot w_1 + \sum_{j \in T_1 \cup T_2} k'_j \qquad (5)$$

Since $w_1$ is positive, and $\Sigma_{j \in T_1 \cup T_2} k'_j$ is a constant irrespective how the partitioning into $T_1$ and $T_2$ is performed. We simplify the value of M is as follows:

$$M = \sum_{j \in T_1} \frac{k'_j \cdot G(T_1)}{f'_j/k'_j} + \sum_{j \in T_2} \frac{k'_j \cdot G(T_2)}{f'_j/k'_j} \qquad (6)$$

At each branch in the partitioning, we evaluate the value over all possible partitions by using the sorted order of $f'_j/k'_j$, and grouping all graph vertices with values of a particular threshold value of $f'_j/k'_j$ into one node, and the remaining in the other. There are as many choices of partitions as the number of graph vertices in the set T. From these different choices of partitions, we pick the partition for which the above value of Q is minimum. This partitioning is used to create the next pair of decision nodes in the tree at the next level. For the case of internal decision nodes, we do not explicitly construct the sketch tables, but we use them in order to maintain information about the graph vertex partitioning.

Figure 3:
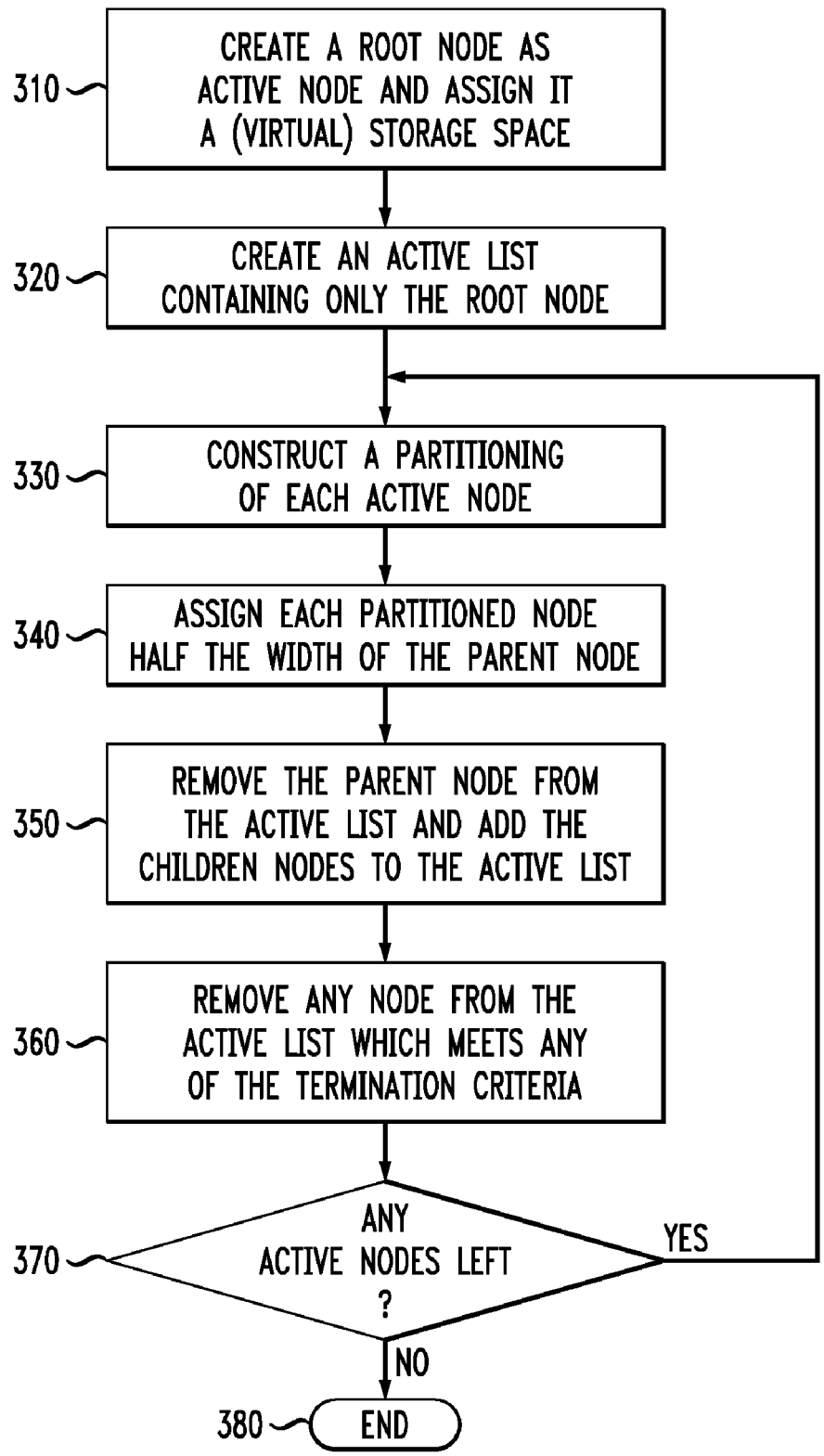
FIG. 3 shows an exemplary process for sketch partitioning according to an embodiment of the invention.

FIG. 3 shows an exemplary algorithm for constructing a partition tree according to an illustrative embodiment of the present invention. In step 310, a root node is created as an active node and is assigned a (virtual) storage space with width of w and depth of d. In step 320, an active list containing only the root node is created. In step 330, a partitioning of each active node is created so as to minimize an objective function. This objective function may be, for example, Equations (1), (3) or (5) heretofore discussed, or Equation (7) to be discussed hereinafter. In step 340, each partitioned node is assigned half the width of the parent node. In step 350, the parent node is removed from the active list and the children nodes are added to the active list. In step 360, any node from is removed from the active list which meets termination criteria. These termination criteria may include the width at a given level being less than a particular threshold $w_0$. Alternatively or additionally, the termination criteria may include a number of distinct edges at a given level being less than a constant factor of the sketch table width, which may indicate a need for further modifications in order to save on sketch table space. These termination criteria are discussed in further detail hereinafter.

In step 370, a determination is made as to whether any active nodes remain. If so, the process loops back to step 330. If not, the process concludes in step 380.

We note that even though the vertices are partitioned using the objective function at each level of the tree, the sketch tables are constructed only at the leaves of this decision tree. The nature of the sketch table at the leaf level of the tree can be of one of two types depending upon the termination criterion used.

In one embodiment of step 360, there are two possible termination cases. The first case is when the width of the partition at a given level is less than a threshold $w_0$. In this case, we do not partition the sketch table further, and build it explicitly at that level.

A second termination case is when the number of distinct items being counted is less than a given factor of the sketch table width. Specifically, if $w_i$ be the width of the sketch table for a particular vertex partition $T_i$, then for some constant C, we check if $\Sigma_{j \in T_i} k'_j/C \cdot w_i$. In such a case, the probability of any collision in a particular cell for a given hash function can be bounded above by a constant value $1-e^{-1/C}$, where e is the base of the natural logarithm. In such a case, we set the width of the corresponding sketch table to $\Sigma_{j \in T_i} k'_j/C$. Further, the depth of the sketch table is set to one-fourth of the depth of the sketch tables in other leaf tree nodes in order to save space. This is because it is experimentally observed that such leaf nodes are very accurate in frequency estimation and it is not necessary to allocate excess depth to it. This helps in saving storage space which can be allocated to other nodes.

Another exceptional case is one in which a particular graph vertex occurring the data stream does not occur in the original data sample. In an illustrative embodiment, for such edges, a fixed portion of the original data set is allocated as an outlier partition and a separate sketch table is constructed in order to count the frequency of these edges. For the purpose of querying, those graph vertices which do not occur in any partition are resolved by using this special outlier partition of the sketch table.

As heretofore discussed, the process of partitioning (e.g., step 210 in FIG. 2) is a pre-processing step for determining the association of vertices to different partitions (e.g., step 220 in FIG. 2). This information about the association of vertices to partitions is an overhead which needs to be stored along with the sketch table. However, this overhead is small compared to the advantages of the partitioning process over the global sketch table. The mapping of vertices to partitions is the only additional information which needs to be maintained during the stream summarization process. We do not need to explicitly store the decision tree which is used for partitioning. As the data stream arrives, we use the associations of the vertices to the partitions in order to update the sketch table in the corresponding partition (e.g., step 220 in FIG. 2).

During the querying phase (e.g., step 230 in FIG. 2), an analogous approach is used in order to first determine the relevant partition. Once the partition has been determined, we use the hash functions on the appropriate sketch table and pick the minimum of values in the corresponding cells to which the hash functions map into.

If both a sample of the data and the query workload are available, the partitioning heretofore discussed can be further optimized by not only using the behavior of the original stream, but also the query workload. Since greater information is available in the second scenario, the optimization of the underlying synopsis structure and query accuracy is also greater in this case.

More particularly, rather than assuming during the partitioning process that each edge was equally likely to be queried, it is possible to estimate the relative frequencies of the different queries. Since the partitioning is performed on the vertices, we can estimate the relative weights of the vertices for the querying process. The relative weight of a vertex is the relative frequency of an edge emanating from that vertex to be used in the querying process. Let $q'_1 \ldots q'_V$ be the relative frequencies of the edges occurring in the query. Note that $q'_i$ is essentially analogous to $f'_i$, except that it is defined on the sample query set as opposed to the sample data. The optimization function $O_i$ is defined as:

$$O_i = \sum_{j \in T_i} \frac{q'_j \cdot G(T_i)}{f'_j / k'_j} \quad (7)$$

This optimization function is designed in order to account for the fact that there are $O(q'_j)$ queries emanating from vertex j. At a given node of the decision tree, we would like to create two partitions $T_1$ and $T_2$, such that the objective function $M=T_1+T_2$ is optimized. Specifically, the objective function for a partition at a given level is as follows:

$$M = \sum_{j \in T_1} \frac{q'_j \cdot G(T_1)}{f'_j / k'_j} + \sum_{j \in T_2} \frac{q'_j \cdot G(T_2)}{f'_j / k'_j} \quad (8)$$

As discussed above, we sort the vertices in order of $f'_i/q'_i$ and perform the partition at the point which minimizes the objective function. We use the sorted order to determine the partition which optimizes the corresponding objective function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Such a system may include distinct software modules (for example, a partitioning module executing on a hardware processor). Furthermore, aspects of the present invention may take the form of a computer program product embodied in one or more computer readable medium(s) having computer readable program code embodied thereon.

Additionally, the techniques as heretofore described can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 4:
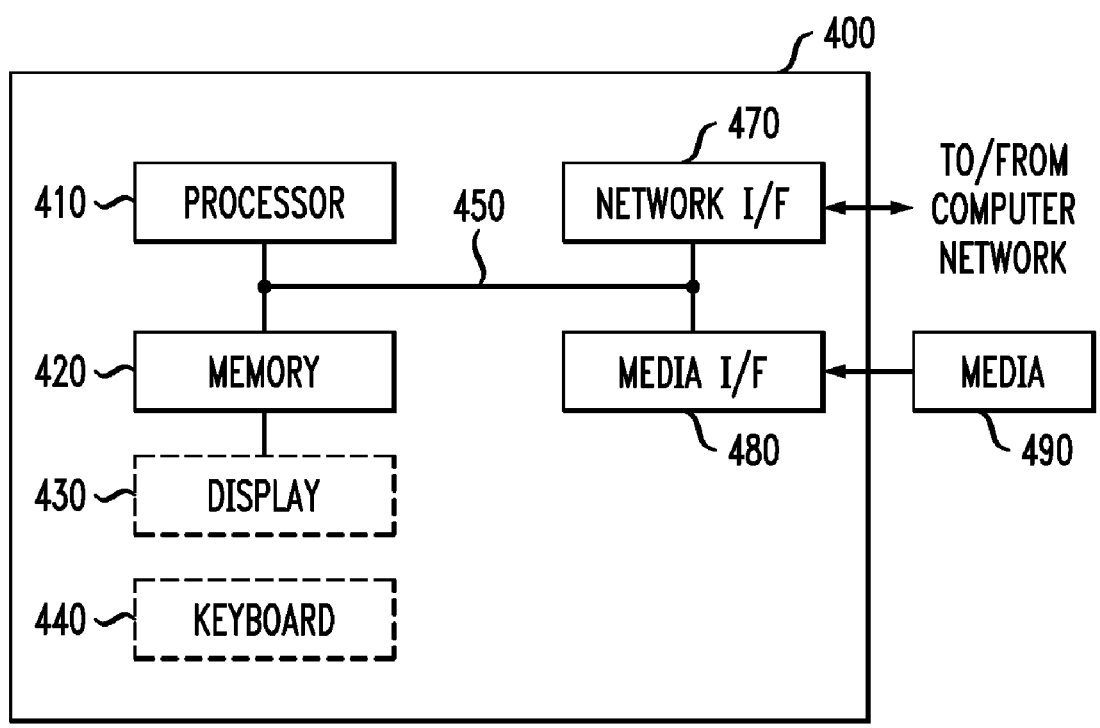
FIG. 4 shows a computer system that may be useful in implementing one or more aspects and/or elements of the invention.

One or more embodiments can make use of software running on a general purpose computer or workstation. With reference to FIG. 4, such an implementation employs, for example, a processor 410, a memory 420, and an input/output interface formed, for example, by a display 430 and a keyboard 440. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 410, memory 420, and input/output interface such as display 430 and keyboard 440 can be interconnected, for example, via bus 450 as part of a data processing unit 460. Suitable interconnections, for example via bus 450, can also be provided to a network interface 470, such as a network card, which can be provided to interface with a computer network, and to a media interface 480, such as a diskette or CD-ROM drive, which can be provided to interface with media 490.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 490) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

A data processing system suitable for storing and/or executing program code can include at least one processor 410 coupled directly or indirectly to memory elements 420 through a system bus 450. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 440, display 430, pointing device, and the like) can be coupled to the system either directly (such as via bus 450) or through intervening I/O controllers (omitted for clarity).

Network adapters such as network interface 470 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 460 as shown in FIG. 4) running a server program. It will be understood that such a physical server may or may not include a display and keyboard.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for executing a query on a graph data stream, the method comprising the steps of:
    accessing a graph data stream, the graph data stream comprising data representing edges that connect vertices of a graph;
    constructing a plurality of synopsis data structures based on at least a subset of the graph data stream, wherein each vertex connected to an edge represented within the subset of the graph data stream is assigned to a synopsis data structure such that each synopsis data structure represents a corresponding section of the graph data stream;
    mapping each received edge represented within the graph data stream onto the synopsis data structure which corresponds to the section of the graph data stream which includes that edge; and
    using the plurality of synopsis data structures to execute a frequency query on the graph data stream, wherein executing a frequency query comprises estimating a frequency of one or more edges in the data stream graph using the synopsis data structures, wherein estimating comprises determining an aggregate frequency of edges in one or more synopsis data structures;
    wherein the constructing, mapping and using steps are executed on a computing system comprising a processor and a memory, wherein one or more software modules for implementing the constructing, mapping and using steps are loaded from the memory and executed by the processor.

2. The method of claim 1, wherein the plurality of synopsis data structures comprise sketch tables.

3. The method of claim 1, wherein the plurality of synopsis data structures comprise hash-based sketch data structures.

4. The method of claim 1, wherein each edge represented within the graph data stream but not within the subset of the graph data stream is mapped onto a given one of the plurality of synopsis data structures.

5. The method of claim 1, wherein the one or more vertices are assigned to a given one of the plurality of synopsis data structures based at least in part on an aggregate frequency of the edges connected to each of the one or more vertices.

6. The method of claim 5, wherein the one or more vertices are assigned to a given one of the plurality of synopsis data structures so as to minimize an objective error function.

7. The method of claim 1, wherein constructing the plurality of synopsis data structures comprises constructing a partition decision tree.

8. The method of claim 7, wherein each leaf of the partition decision tree corresponds to a given one of the plurality of synopsis data structures.

9. The method of claim 7, wherein an objective error function is minimized at each level of the partition decision tree.

10. The method of claim 1, wherein constructing the plurality of synopsis data structures comprises assigning a relative weight to a given vertex based on a relative frequency of at least one edge connected to the given vertex being used in a given query.

11. The method of claim 1, wherein mapping the received edge onto the corresponding synopsis data structure comprises storing data representative of the received edge within the corresponding synopsis data structure.

12. The method of claim 1, wherein mapping the received edge onto the corresponding synopsis data structure comprises incrementing one or more values stored within the corresponding synopsis data structure.

13. An apparatus for executing a query on a graph data stream, the apparatus comprising:
    a memory; and
    a processor operative to perform the steps of:
        accessing a graph data stream, the graph data stream comprising data representing edges that connect vertices of a graph;
        constructing a plurality of synopsis data structures based on at least a subset of the graph data stream, wherein each vertex connected to an edge represented within the subset of the graph data stream is assigned to a synopsis data structure such that each synopsis data structure represents a corresponding section of the graph data stream;
        mapping each received edge represented within the graph data stream onto the synopsis data structure which corresponds to the section of the graph data stream which includes that edge; and
        using the plurality of synopsis data structures to execute a frequency query on the graph data stream, wherein executing a frequency query comprises estimating a frequency of one or more edges in the data stream graph using the synopsis data structures, wherein estimating comprises determining an aggregate frequency of edges in one or more synopsis data structures.

14. The apparatus of claim 13, wherein the plurality of synopsis data structures comprise sketch tables.

15. The apparatus of claim 13, wherein each edge represented within the graph data stream but not within the subset of the graph data stream is mapped onto a given one of the plurality of synopsis data structures.

16. The apparatus of claim 13, wherein the one or more vertices are assigned to a given one of the plurality of synopsis data structures based at least in part on an aggregate frequency of the edges connected to each of the one or more vertices.

17. The apparatus of claim 13, wherein the one or more vertices are assigned to a given one of the plurality of synopsis data structures so as to minimize an objective error function.

18. The apparatus of claim 13, wherein constructing the plurality of synopsis data structures comprises constructing a partition decision tree.

19. A computer program product comprising a tangible, non-signal, computer readable recordable storage medium including computer usable program code for executing a query on a graph data stream, the computer program product comprising:
   computer usable program code for accessing a graph data stream, the graph data stream comprising data representing edges that connect vertices of a graph;
   computer usable program code for constructing a plurality of synopsis data structures based on at least a subset of the graph data stream, wherein each vertex connected to an edge represented within the subset of the graph data stream is assigned to a synopsis data structure such that each synopsis data structure represents a corresponding section of the graph data stream;
   computer usable program code for mapping each received edge represented within the graph data stream onto the synopsis data structure which corresponds to the section of the graph data stream which includes that edge; and
   computer usable program code for using the plurality of synopsis data structures to execute a frequency query on the graph data stream, wherein executing a frequency query comprises estimating a frequency of one or more edges in the data stream graph using the synopsis data structures, wherein estimating comprises determining an aggregate frequency of edges in one or more synopsis data structures.

20. The computer program product of claim 19, wherein the plurality of synopsis data structures comprise sketch tables.

21. The computer program product of claim 19, wherein each edge represented within the graph data stream but not within the subset of the graph data stream is mapped onto a given one of the plurality of synopsis data structures.

22. The computer program product of claim 19, wherein the one or more vertices are assigned to a given one of the plurality of synopsis data structures based at least in part on an aggregate frequency of the edges connected to each of the one or more vertices.

23. The computer program product of claim 19, wherein the one or more vertices are assigned to a given one of the plurality of synopsis data structures so as to minimize an objective error function.

24. The computer program product of claim 19, wherein constructing the plurality of synopsis data structures comprises constructing a partition decision tree.

* * * * *